United States Patent [19]

Locke et al.

[11] Patent Number: 5,404,692

[45] Date of Patent: * Apr. 11, 1995

[54] PROCESS AND COMPOSITION FOR PROTECTING AND CUSHIONING EXTERIOR SURFACES

[75] Inventors: Ralph J. Locke, Charlevoix, Mich.; Paul T. Dennis, Glendale, Wis.; David C. Netherton, Barrington, Ill.

[73] Assignee: Plan B, Inc., Wauwatosa, Wis.

[*] Notice: The portion of the term of this patent subsequent to Jan. 30, 2007 has been disclaimed.

[21] Appl. No.: 988,406

[22] Filed: Dec. 7, 1992

Related U.S. Application Data

[62] Division of Ser. No. 582,512, Sep. 13, 1990, abandoned.

[51] Int. Cl.6 .................. B65B 53/02; B65B 61/00
[52] U.S. Cl. ........................... 53/411; 53/442; 426/129; 426/412; 426/415
[58] Field of Search .............. 53/131.1, 139.5, 139.7, 53/411, 442, 472, 427, 557; 206/497, 524.3, 524.8; 426/412, 415, 129

[56] References Cited

U.S. PATENT DOCUMENTS

| | | | |
|---|---|---|---|
| 3,039,245 | 6/1962 | Jones | 53/411 |
| 3,557,518 | 1/1971 | Purkey | 53/472 X |
| 3,653,927 | 4/1972 | Howell et al. | 426/412 |
| 3,717,601 | 2/1973 | Jurrens | 524/271 |
| 3,983,258 | 9/1976 | Weaver | 53/442 X |
| 4,212,910 | 7/1980 | Taylor et al. | 428/35 |
| 4,345,349 | 8/1982 | Flanagan | 524/271 |
| 4,501,846 | 2/1985 | Goss | 524/274 |
| 4,534,984 | 8/1985 | Kuehne | 426/412 |
| 4,752,634 | 6/1988 | Goss | 524/271 |
| 4,770,731 | 9/1988 | Ferguson | 426/129 X |
| 4,897,276 | 1/1990 | Locke et al. | 53/472 x |

Primary Examiner—Linda B. Johnson
Attorney, Agent, or Firm—Basile and Hanlon

[57] ABSTRACT

A process is provided for packaging a product, particularly one with sharp protrusions or discrete fragile regions. The process includes the steps of applying a polymeric material to an exterior surface of an outer packaging container, in the region covering sharp protrusions, thereby providing a protective cushion against rupture or tearing of the container surrounding the product during shipping and storage. The liquified polymeric composition containing a microcrystalline wax is applied at a point-of-contact temperature between about 75° F. and about 160° F.; the applied material is then allowed to solidify in the form of a flexible resilient coating. The polymeric material used in the process consists essentially of a polymer, a synthetic or naturally occurring tackifying resin, a microcrystalline wax, and an antioxidant stabilizer.

13 Claims, No Drawings

PROCESS AND COMPOSITION FOR PROTECTING AND CUSHIONING EXTERIOR SURFACES

This application is a divisional application of Ser. No. 582,512, filed on Sep. 13, 1990, now abandoned.

BACKGROUND OF THE INVENTION

1. Field of the Invention

This invention generally relates to packaging processes, and in particular to those processes pertaining to the packing of items having sharp or fragile surfaces. More particularly, this invention relates to the application of cushioning materials to exterior container surfaces. This invention also relates to foamed or non-foamed polymeric materials suitable for use in such processes.

2. Description of the Relevant Art

In a variety of areas, it is necessary to package products in such a manner that sharp protrusions or fragile portions are cushioned. This is particularly necessary in any industry where products are wrapped in air-tight polymeric films.

One of these industries is the food industry, and particularly the meat packing industry. Most meat portions are irregularly shaped and contain bones which protrude at one or more places on the cut. The relatively sharp protrusions can tear and pierce the outer polymeric wrap in which the meat is encased. During storage and shipment from packing plant to warehouse, retailer or user, the cut is handled several times, further increasing the chances of puncture or tearing of the outer wrap. This is particularly possible at the point of contact between the bag and the protruding bone. Vacuum packaging to increase storage life also increases the risk of the outer wrap tearing. In vacuum packaging, the wrap is forced to conform to the contours of the meat during the evacuation process. This can cause stretching and strain over the protruding areas.

Various approaches have been tried to overcome the problems associated with torn or leaking outer wrappers. For example, the outer wrapper material may be strengthened to resist puncture. This would entail modification of the content or thickness uniformly throughout the wrapper which would be expensive and unnecessary in view of the fact that the areas likely to be punctured are relatively limited.

Specialized containers have been proposed such as the one disclosed to U.S. Pat. No. 4,136,205 to Quattlebaum. Such containers or bags are generally reinforced with suitable cloth or strengthening material at points in the bag which roughly correspond to the protrusions. These containers are relatively expensive and require accurate placement of the meat cut within them if they are to function satisfactorily.

Various drawbacks can be found when applying a hot melt material to an exterior surface of a polymeric bag or other outer containers. If the contact temperature were too high, the strength and integrity of the polymeric bag or container would be compromised. Where the application temperature would be low enough so as to keep the container integrity intact, problems with insufficient adhesion would be generally encountered. Aside form the meat packing industry, many other industries involved in packing or shipping products having fragile regions needing additional protection are searching for ways to cushion and protect these regions.

Thus, it is desirable to provide a process for protecting the exterior surfaces of products having sharp protrusions or fragile regions. It would be desirable that this process employ a polymeric material which can be easily and selectively applied to these surfaces without compromising the strength and integrity of a polymeric bag or container, and without harming the product if applied to the product surface itself. It is also desirable to provide a process in which a foamed or non-foamed material can be produced at the use site and dispatched at low temperatures for a variety of packaging and other applications.

SUMMARY OF THE INVENTION

The invention comprises a process for cushioning an exterior rupture-prone region of an outer packaging container when the container is in overlying relationship to a product. The process comprises the steps of selectively applying a liquified polymeric composition which contains a petroleum-derived wax to the region at a point-of-contact temperature between about 75° F. and about 160° F., with a preferred range between about 90° F. and about 130° F. The applied material is then allowed to solidify in the form of a flexible resilient coating. The petroleum-derived wax may be a petroleum wax, a synthetic wax or a microcrystalline wax. In addition to the wax, polymeric composition employed in the present invention consists essentially of a polymer selected from the group consisting of ethylene vinyl acetate copolymers, polyethylene, amorphous polyolefins, amorphous polyalpha olefins, block copolymers, and mixtures thereof, and a hydrocarbon capable of extending the adhesive properties and improving the specific adhesion of the polymer employed with the hydrocarbon being present in amounts sufficient to impart flexible resiliency to the applied material. The microcrystalline wax employed in the present invention, preferably, has a melting point between about 148° F. and about 205° F., with the wax being present in an amount sufficient to impart sprayability to the polymeric material. Also, an antioxidant stabilizer may also be present in an amount sufficient to prevent appreciable oxidation of the polymeric material and a surrounding substrate.

DESCRIPTION OF THE PREFERRED EMBODIMENT

This invention is predicated on the unexpected discovery that a newly-formulated non-foamed or foamed material can be successfully applied at low temperatures on the exterior surfaces of, for example, a polymeric bag without adversely affecting the strength or integrity of the bag. Selective applications of this material on the exterior of a bag, particularly in the region of the bag covering sharp protrusions, provides a protective cushion against rupture or tearing of the bag surrounding the product during shipping and storage.

Heretofore, it was widely held that microcrystalline waxes could be used as inert additives or extenders in various polymeric formulations. It was believed that the microcrystalline wax would not alter the performance characteristics of the polymeric composition. However, it has been found quite unexpectedly, that in certain unique circumstances that polymeric materials which include a sufficient portion of microcrystalline wax or waxes will exhibit improved characteristics of sprayability and adhesion.

In the particular process of the present invention, an exterior rupture-prone region of an outer packaging container is cushioned by selective application of the polymeric material of the present invention when the container is in overlying relationship to the product contained therein. The process may also be used for cushioning an outer, discrete, fragile region of the product surface itself. The process comprises the steps of selectively applying a liquified polymeric composition containing a microcrystalline wax to the particular region needing protection or reinforcement at a point-of-contact temperature between about 75° F. and about 160° F., with a preferred range between about 90° F. and about 130° F. The applied material is then allowed to solidify in the form of a flexible resilient coating. This process leads to the formation of a puncture resistant container.

The polymeric material employed in the present invention consists essentially of:
- a polymer able to provide a suitable backbone for the applied cushioning material;
- a hydrocarbon selected from the group consisting of synthetic tackifying resins, naturally occurring tackifying resins, and mixtures thereof, the hydrocarbon present in an amount sufficient to impart flexible resiliency to the polymeric material; and
- a wax capable of reducing melt viscosity, itself having a melting point between about 148° F. and about 205° F., the wax present in an amount sufficient to impart sprayability to the polymeric material. An antioxidant stabilizer may optionally be present in an amount sufficient to prevent appreciable oxidation of the cushioning material and surrounding substrate.

The polymeric substrate suitable for application as a cushioning material is prepared by the admixture of polymer, hydrocarbon, and wax with heating sufficient to achieve liquification of the substrate. If foaming is desired, the substrate can be admixed with a suitable foaming agent immediately prior to application. To achieve this, liquid polymeric substrate is held at a temperature suitable to maintain the substrate in a liquid state, preferably between about 180° F. and about 350° F. When foaming is desired, the liquified polymeric substrate is preferably combined with a stream of gas in a ratio of gas to substrate between about 1:1 and about 1:10. The foamed material begins cooling immediately as it is dispensed; losing heat to the surrounding atmosphere at a rate sufficient to permit solidification to begin to occur upon dispensing. The cooling rate in combination with the nature of the dispensed material permits it to remain sufficiently formable upon dispensing so as to adhere readily to the product and conform to its shape.

The liquified polymeric material of the present invention can be applied to various products using a heated, pressurized spray applicator such as a modified paint spray gun. A spray applicator suitable for use in this invention will have a pressurized heating tank capable of maintaining the liquified material at a temperature between about 180° F. and about 350° F., and a pressure between about 40 and about 80 psi. The heated pressurized material is dispensed through a suitable external spray nozzle. Other suitable application devices and techniques will become apparent to those reasonably skilled in the art upon reading this disclosure.

The polymer employed in the present invention is generally classified as a polyolefin or a copolymer of various polymers and monomers. The polymer may be selected from the group consisting of amorphous polyolefins (APO), amorphous polyalphaolefins (APAO), and mixtures thereof. Suitable polyolefins are commercially available from many different manufacturers. Examples of these are the Amorphous Polyolefin M5 series of Eastman Chemical Corporation. Suitable amorphous polyalphaolefins are also commercially available from many sources, including from the Rexene Corporation of Dallas, Tex. under the tradename REXTAC.

The copolymer may be selected from one of various copolymers of ethylene vinyl acetate as well as block copolymers having the general configuration:

A-B-A or A-B-A-B-A-B wherein the polymer blocks A are non-elastomeric polymer blocks which, as homopolymers have glass transition temperatures above 20°., while the elastomeric polymer blocks B are selected from the group consisting of isoprene, butadiene. Further, they may be linear or branched. Typical branched structures contain an elastomeric portion with at least three branches which can radiate out from a central hub or can be otherwise coupled together.

The non-elastomeric blocks which make up approximately 17 to 75%, by weight of the block copolymer may comprise homopolymers or copolymers of vinyl monomers such as vinyl arenes, vinyl pyridines, vinyl halides and vinyl carboxylates, as well as acrylic monomers such as acrylonitrile, ethacrylonitrile, esters of acrylic acids, etc. Monovinyl aromatic hydrocarbons include particularly those of the benzene series such as styrene, vinyl toluene, vinyl ethylene, ethyl vinyl benzene as well as dicyclic monovinyl compounds such as vinyl napthalene and the like. Other non-elastomeric polymer blocks may be derived from alpha olefins, alkylene oxides, acetals, urethanes, etc. Styrene is preferred.

Typical of the rubbery block copolymers useful herein are the polystyrene-polyisoprene-polystyrene types containing at least 17% styrene which may be prepared using methods taught, for example, in the U.S. Pat. Nos. 3,239,478; 3,427,269; 3,700,633; 3,753,936 and 3,932,327. Alternatively, they may be obtained from Shell Chemical Co. for example under the tradename Kraton.

Typical of unvulcanized elastomeric triblock or multiblock copolymers employable in the present invention are those in which the monomeric moieties are arranged in an alternating sequence having the general configuration S-I-S or S-I-S-I-S-I, wherein the styrene provides the non-elastomeric block and the isoprene the elastomeric polymer block. The styrene component of the block copolymer ranges from about 12 to 50 parts per 100 parts copolymer. Suitable styrene-isoprene block copolymers for use herein are available commercially from Enichem Americas under the tradename "Sol T". Other suitable multiblock copolymers are those in which monomeric moieties are arranged in an alternating sequence having the general configuration S-B-S or S-B-S-B-S-I wherein the styrene provides the non-elastomeric block and the butadiene the elastomeric polymeric block.

Typical of teleblock copolymers employable in the present invention are those having at least branches radially branching out from a central hub, each said branch having polystyrene terminal blocks and an isoprene segment in the center. This type of block copolymer may also be described as having a branched polymerized isoprene midblock with a polystyrene terminal block at the end of each branch. The styrene component of the block copolymer ranges from about 25 to 50 parts per 100 parts copolymer.

It is to be understood that an exact molecular weight range for the selected copolymer, APO or APAO is difficult to determine with exactitude. Various polymers of varying molecular weight can be employed in the composition of the present invention. The polymer will, preferably, be of appropriate molecular weight and configuration that, it will impart a suitable internal structure to the cushioning material to provide elevated levels of shear strength and puncture resistance. The average molecular weight of the selected copolymer, APO, or APAO employed will vary with the particular characteristics of the polymer chosen, as would be readily discernable to one reasonably skilled in the art.

The amount of concentration of the chosen polymer employed in the liquified polymeric material is an amount capable of providing suitable levels of shear strength and puncture resistance to the applied cushioning material. The term "shear strength" is defined herein as the ability of the applied cushioning material to resist lateral or oblique shearing or tearing forces which might otherwise result in complete removal of all or part of the material from the package surface or sectional separation of an entire outer region of the material from a portion which remains adhere to the package surface. The term "puncture resistance" as employed herein is defined as the ability of the applied material to resist puncture or penetration by a localized force exerted by any sharp protrusion or pointed element. The term is to be taken in this context to include to a rigid material or one having, at least, a rigid outer skin as well as materials having compressible or breakable cells. Without being bound to any theory, it is believed that compressible materials may act in a sacrificial agent with the individual foamed cells compressing or rupturing upon application of a compressive force.

It has been found that the higher the polymer content, the better the spray characteristics. The polymer can be present in a wide range of percentages by weight, up to about 85% polymer. However, the rate at which the product sets or cools should be monitored. If there is a low polymer content and a high wax content, this leads to a quick set point of the material. The set point of the present composition should be between about 75° F. and about 180° F.

The hydrocarbon employed in the present invention is generally one which will extend the adhesive properties and improve the specific adhesion of the polymer employed. Such materials are generally classified as tackifier resins. As used herein, the term "tackifying resin includes, but is not limited to the following:

a) Natural and modified rosin such as, for example, gum rosin, wood rosin, tall-oil rosin, distilled rosin, hydrogenated rosin, dimerized rosin, polymerized rosin and functional equivalents thereof; and b) Glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of hydrogenated rosin, the pentaerythritol ester of polymerized rosin, and functional equivalents thereof.

The preferred hydrocarbon tackifier resins are derived from hydrocarbon resin streams containing primarily aromatic, aliphatic, and/or diene (cyclic olefin) monomers. A detailed discussion of various suitable hydrocarbon tackifier resins can be found in the *Handbook of Pressure Sensitive Adhesive Technology*, 2nd Edition (1989) in Chapter 20 entitled "Tackifier Resins" written by James A. Schlademan, which is incorporated herein by reference. Suitable resins can be described by the average number of carbon atoms per monomer molecule. In the preferred embodiment, the hydrocarbon employed is preferably chosen from the group consisting of C-5 resins, synthetic polyterpene, modified C-5 resins, modified synthetic polyterpene, C-5/C-9 resins, or mixtures thereof. Suitable hydrocarbon resins are commercially available, however, exact percentages or molecular configurations of these various resins, if known, are proprietary and not typically revealed to the end user.

According to the present invention, the naturally occurring and synthetic tackifying resins may be used alone or in combination. Where various resins are employed in combination, it is preferred that they be combined to yield a melting point between about 150° F. and about 155° F. Preferably, the melting point of any liquid resin component employed would range between about 50° F. and about 77° F., while the melting point of any hard resin component would range between about 176° F. and 239° F.

A variety of suitable commercially available resins can be used in the present invention. Examples of these include those commercially available from the Goodyear Chemical Company of Akron, Ohio under the tradenames WINGTACK 10, WINGTACK 95, WINGTACK PLUS, and WINGTACK EXTRA, as well as ESCOREZ 2101 available from Exxon Chemicals. Contemplated equivalents of these tackifying resins can be found in "Table 1—Modifying Resins—Types and Properties" in the *Handbook of Adhesives*, 3rd Ed. (1990) at page 564, relevant portions of which are reproduced below as Table 1. Others may be included as would be considered suitable by one skilled in the art.

TABLE 1

| RESIN TYPE | TRADENAME | SOFTENING POINT, °C. | MANUFACTURER |
|---|---|---|---|
| Rosins: | | | |
| Gum Rosin | | 78 | |
| Tall oil rosin | | 80 | |
| Wood Rosin | PEXITE | 73 | Hercules, Inc. |
| Modified Rosins: | | | |
| Hydrogenated rosin | STAYBELITE | 68 | Hercules, Inc. |
| Rosin eaters: | | | |
| Glycerine-highly hydrogenated wood | FORAL 85 | | Hercules, Inc. |

TABLE 1-continued

| RESIN TYPE | TRADENAME | SOFTENING POINT, °C. | MANUFACTURER |
| --- | --- | --- | --- |
| rosin | | | |
| Hydrocarbon resins: | | | |
| Aliphatic petroleum | PICCOTAC series | 70–115 | Hercules, Inc. |
| | ESCOREZ series | 90–115 | Exxon Chemical Company |
| | WINGTACK series | 86–115 | Goodyear Chemicals |
| Polymerized Terpenes: | | | |
| Alpha-pinene | PICCOLYTE A series | 115–135 | Hercules, Inc. |
| d-Limonene | PICCOLYTE C series | 10–135 | Hercules, Inc. |
| Beta-pinene | PICCOLYTE S series | 10–135 | Hercules, Inc. |

In the polymeric substrate of the present invention, a wax is employed in sufficient quantity to impart sprayability to the material. The wax employed may be selected from the group consisting of petroleum waxes, synthetic waxes, and mixtures thereof. The term "wax" as employed herein may be defined as a substance that is a plastic solid at ambient temperature, that on being subjected to moderate elevated temperatures becomes a low viscosity liquid. While the chemical composition of waxes can be extremely complex with a broad range of molecular weight species and conceivably reactive functional groups, the petroleum waxes and synthetic waxes employed in the present invention are totally hydrocarbon compounds (i.e., containing carbon and hydrogen).

Synthetic waxes which may be employed in the polymeric substrate of the present invention include Fischer-Tropsch process, also known as synthetic paraffins. Waxes derived by the Fischer-Tropsch process, employed herein are paraffins produced by the catalytic hydrogenation of carbon monoxide and are generally white, brittle materials having an essentially microcrystalline structure and melt points at or about 212° F.

Petroleum waxes which may be employed in the polymeric substrate of the present invention can be generally classified as either paraffin waxes or microcrystalline waxes. Petroleum waxes are generally byproducts of lube oil refining processes.

The paraffin waxes employed in the present invention are preferably composed of straight-chain hydrocarbons with few branched or cyclic structures. The paraffin waxes employed in the present invention have melting points between about 120° F. and 160° F. and molecular weights ranging from approximately 300 to about 450. The carbon chains of the paraffin waxes generally vary in length from about eighteen to about forty carbon atoms.

In the preferred embodiment of the polymeric composition of the present invention contains microcrystalline wax. Microcrystalline waxes are petroleum waxes having a melting point between about 135° F. and 200° F. as determined by ASTM method DI27-60 containing between about thirty and about seventy-five carbon atoms with molecular weights ranging between about 500 and about 800. The material is generally composed of complex mixtures of monocyclic and polycyclic hydrocarbons and a lesser amount of branched chain isoparaffins.

The microcrystalline waxes of choice are those which having oil contents between about 0.5 and about 20% and a penetration value less than about 50 at 77° F. Microcrystalline waxes of particular efficacy in the practice of the present invention are those having relatively thin crystal lattice structures and containing lower concentrations of n-paraffinic hydrocarbons and higher relative concentrations of branched and naphthenic hydrocarbons. N-paraffinic hydrocarbons in concentrations between about 20% and about 40% would be desirable.

In the preferred embodiment, the microcrystalline wax employed has a melting point between about 148° F. and about 205° F. and a needle penetration value at 77° F. between about 10 decimillimeters about 30 decimillimeter needle penetration value being determined by the method outlined in ASTM 1321. It is to be understood that penetration values are inversely proportional to the hardness of the wax. Thus, the harder the wax, the lower the penetration value. Examples of suitable waxes include those commercially available from Moore and Munger Marketing and Refining under the tradename M-4070; those commercially available from Mobil Oil Corporation under the tradename MW-2305; and those available from Petrolite Corporation of Tulsa, Okla. under the general tradename BARECO. Examples of various BARECO waxes suitable for use in this invention include STARWAX 100, ULTRAFEX, VICTORY, BE SQUARE 175 and BE SQUARE 185.

Without being bound to any theory, it is believed that the presence of hydrocarbon wax in the formulation of the present invention controls when the formula goes into the molten state, and the melting point determines how the material performs. The presence of hydrocarbon wax in the formulation is also believed to be important in controlling the sprayability of the formulation. The crystallinity of the wax is believed to impart more flexibility to the polymeric material at lower temperatures, particularly after application, due to the small crystal lattice. Generally, microcrystalline waxes having smaller crystal lattices are desirable, since it is believed that they are more flexible and that the microcrystals are dispersed in a large amount of amorphous material. It is currently held that this amorphous material is a super-cooled liquid so viscous as to be unable to flow except under high pressure which acts as a plasticizer. The plastic solid nature of the wax serves to plasticize the amorphous hydrocarbon resins, co-polymer resins and synthetic elastomers to which it is added.

Optional components such as antioxidant stabilizers can be incorporated to help protect the polymeric composition from the thermal and oxidative degradation which is frequently encountered during the manufacture and application of the polymeric composition as well as in the ordinary exposure of the final product. Such degradation is usually manifested by deterioration in appearance, physical properties and performance. Examples of suitable stabilizers are high molecular weight hindered phenols and multifunctional phenols, such as sulfur and phosphorous-containing phenols. Hindered phenols are well known to those skilled in the art and may be characterized as phenolic compounds which also contain sterically bulky radicals in close proximity to the compound's phenolic hydroxyl group. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this stearic hindrance thus providing the phenolic compound with its stabilizing properties. Representative hindered phenols include: 1,3,5-trimethyl-2,4,6-tris(3-5-di-tert-butyl-4-hydroxybenzyl)benzene; pentaerythritol tetrakis-3 (3,5,-di-tert-butyl-4-hydroxyphenyl)propionate; n-octadecyl-3 (3,5-di-tert-butyl-4-hydroxyphenyl)propionate; 4;4'-methylenebis(4-methyl-6-tert-butylphenol); 4,4'-thiobis (6-tert-butyl-o-cresol); 2,6-di-tert-butylphenol; 6-(4-hydroxyphenoxy)-2,4-bis((n-octylthio)-1,3,5-triazine; 2,4,6-tris (4-hydroxy-3,5-di-tert-butyl-phenoxy)-1,3,5-triazine; di-n-octadecyl-3,5-di-tert-butyl-4-hydroxybenzylphosphonate; 2-(n-octylthio)ethyl-3,5-di-tert-butyl-4-hydroxybenzoate; and sorbitol hexa-(3,3,5-di-tert-butyl-4-hydroxy-phenyl propionate).

The following compounds used in conjunction with the stabilizers may further enhance their performance: synergists such as thiodipropionate esters and phosphites; and chelating agents and metal deactivators such as ethylenediaminetetraacetic acids, salts thereof, and disalicylalpropylenediimine.

The antioxidant stabilizer is preferably selected from the group consisting of dilauryl thiodipropionate, tetrakis[methylene (3,5-di-tert-butyl-4-hydroxyhydrocinnamate)]methane, and mixtures thereof. Suitable materials are commercially available from the American Cyanamid Company of Wayne, N.J. under the tradename CYANOX, and from Ciba-Giegy Limited under the tradename IRGANOX 1010.

Various additives can also be included in the formulation. These can include various other antioxidants, preservatives and the like. Such additives can comprise up to about 3% by weight of the total formula.

As generally practiced in this invention, the polymeric substrate contains between about 10% and about 85% by weight polymer, between about 15% and about 85% by weight hydrocarbon, and between about 5% and about 30% by weight wax. The polymeric substrate preferably contains between about 14% and about 30% by weight polymer, between about 53% and about 60% by weight hydrocarbon, and between about 16% and about 26% by weight wax. The polymeric substrate may also optionally contain between about 0.05 and about 1.0% by weight antioxidant stabilizer with between about 0.5% and about 1.0% by weight being preferred.

When the polymeric material is admixed with a gas to induce foaming, the gas chosen is preferably a non-oxidative material. The gas may be selected from the group consisting of nitrogen, helium, hydrogen, argon, and mixtures thereof with the preferred material being selected from the group consisting of carbon dioxide, nitrogen, oxygen, air, and mixtures thereof.

The composition of the present invention is preferably applied to the exterior surface of a polymeric bag, in a region where a sharp protrusion or fragile region is inside the bag. However, this composition could be used in conjunction with corrugated boxes, particle board, or even directly to the surfaces of fragile objects such as computers, televisions, etc. The composition may be foamed or non-foamed, to fit the needs of the end user.

The polymeric substrate composition is admixed and maintained in a liquid or semi-liquid state until it is dispatched upon application to the product. Preferably the material is held at a tank temperature between about 180° F. and about 350° F. If desired, prior to dispatch the liquid or semi-liquid polymeric substrate is admixed with the suitable gas to entrain the gas therein. The polymeric mixture, or the gas and polymeric mixture, which forms the non-foamed or foamed material, respectively, is then dispatched through a suitable applicator and applied to the product. In the foamed version, the resulting polymer has the gas encapsulated therein.

In the process of the present invention, it is preferred that the polymeric material have a temperature below about 180° F. at the point at which the material contacts the product to be cushioned. Preferably, the point-of-contact temperature is between about 75° F. and about 160° F. At temperatures within this range, the material can be applied directly to a product without detrimental effects caused by localized heating. An example of a detrimental effect when using the material on the exterior of a polymeric bag would be the loss of strength and integrity of the bag, i.e. melting, due to excessive heat. The material retains sufficient flexibility to conform to the shape of the product and adheres readily to the product.

Heretofore, it was believed that any microcrystalline wax added in compositions such as that of the present invention would function as a non-reactive additive or extender. It has been unexpectedly discovered that the addition of such waxes enhances the spray characteristics of the polymeric composition.

The composition of the present invention incorporating these components has excellent spray characteristics as well as optimum adhesion characteristics. The material will hit the spot desired, and adhere well, but will still be easily removed from surrounding machinery, etc., with only a moderate prying force. If a shrink wrap polymeric bag is used, the polymeric material is applied to the product before the shrink tunnel. It will adhere well enough to stay until shrinking, then after the product has been shrink wrapped, the composition will adhere permanently to the exterior of the polymeric shrink wrap.

The polymeric material of the present invention also exhibits appropriate adhesion over wide temperature ranges and variations.

Many of the materials listed in the composition of the present invention comply with the United States Food and Drug Administration regulations pertaining to "Indirect Food Additives: Adhesives and Components of Coatings", 21 C.F.R. § 175,105. The substitution of other non-complying materials would be readily discernable by those skilled in the art upon reading this disclosure. Materials which do not currently comply with or other Federal regulations are to be considered contemplated functional equivalents of the enumerated materials and are considered to be within the scope of the present invention.

While preferred forms and arrangements of parts have been discussed, it is to be understood that various changes, details, and arrangement of parts, as well as modifications of the process, are to be considered within the scope and spirit of this disclosure.

To further illustrate the present invention, the following examples are given. It is to be understood that these examples are for illustrative purposes only and are not to be construed as limiting the scope of the present invention.

EXAMPLE I

A polymeric composition was prepared in the following manner. The following materials were admixed in a stainless steel hot melt mixing vessel. 16.25% by weight BE SQUARE 175, amber grade, commercially available from Petrolite Corporation, having a melting point of 182° F. by the ASTM D-127 test method, and a needle penetration of 17 decimillimeters at 77° F. by the ASTM D-1321 test method; 14.87% by weight WINGTACK 10, a liquid resin commercially available from Goodyear, having a melting point of 50° F. by the ASTM E 28 test method; 38.16% by weight WINGTACK EXTRA, commercially available from Goodyear, having a melting point of 97° C. by the ASTM E 28 test method; 29.72% by weight ELVAX 210, commercially available from DuPont Corporation; 0.50% by weight IRGANOX 1010, commercially available from Ciba-Giegy Limited; and 0.50% by weight CYANOX LTDP, commercially available from American Cyanamid Company. The material was heated to 250° F. The resulting material was a viscous fluid of 2000 to 2400 centipoise (cps) which was decanted into a suitable storage vessel.

EXAMPLE II

A polymeric composition was prepared in the following manner. The following materials were admixed in a stainless steel hot melt mixing vessel. 25.40% by weight M-4070, commercially available from Moore & Munger, having a melting point of 166° F. by the ASTM D-127 test method, and a needle penetration value of 23 decimillimeters at 77° F. by the ASTM D-1321 test method; 20.00% by weight WINGTACK 10 commercially available from Goodyear Corporation; 40.50% by weight WINGTACK 95 commercially available from Goodyear Corporation, having a melting point of 100° C. by the ASTM E 28 test method; 14.00% by weight ELVAX 210, commercially available from DuPont Corporation; and 0.10% by weight IRGANOX 1010, commercially available from Ciba-Giegy Limited. The resulting material was a viscous fluid of 400 to 600 cps which was decanted into a suitable storage vessel.

EXAMPLE III

A polymeric composition was prepared in the following manner. The following materials were admixed in a stainless steel hot melt mixing vessel. 15.0% by weight WINGTACK 10; 38.5% by weight WINGTACK EXTRA, both commercially available from Goodyear; 16.4% by weight BE SQUARE 175, commercially available from Petrolite Corporation; and 0.1% by weight IRGANOX 1010, commercially available from Ciba-Giegy Limited. The resulting material was a viscous fluid which was decanted into a suitable storage vessel. The viscosity of the product was found to be 14,400 at 180° F., 7,300 at 200° F., and 2,072 at 250° F.

EXAMPLE IV

A polymeric composition was prepared in the following manner. The following materials were admixed in a stainless steel hot melt mixing vessel. 15.0% by weight WINGTACK 10; 38.5% by weight WINGTACK EXTRA, both commercially available from Goodyear; 16.4% by weight VICTORY, commercially available from Petrolite Corporation, having a melting point of 175° F. by the ASTM D-127 test method, and a needle penetration value of 26 decimillimeters at 77° F. by the ASTM D-1321 test method; 30% by weight ELVAX 210, commercially available from DuPont Corporation; 0.5% by weight IRGANOX 1010, commercially available from Ciba-Giegy Limited; and 0.5% by weight CYANOX LTDP, commercially available from American Cyanamid Company. The resulting material was a viscous fluid of 2000 to 2400 cps which was decanted into a suitable storage vessel.

EXAMPLE V

A polymeric composition was prepared in the following manner. The following materials were admixed in a stainless steel hot melt mixing vessel. 20% by weight ADTAC LV, a liquid C-5 resin commercially available from Hercules, Inc., having a melting point of 35° C. by the ASTM E 28 test method; 15% by weight BE SQUARE 185, commercially available from Petrolite Corporation, having a melting point of 190° F. by the ASTM D-127 test method, and a needle penetration value of decimillimeters 11 at 77° F. by the ASTM D-1321 test method; 30% by weight EPOLENE C10, commercially available from Eastman Chemical Corporation; 35% by weight REXTAC RT 2730, commercially available from Rexene Corporation, and 0.1% by weight IRGANOX 1010, commercially available from Ciba-Giegy Limited. The composition exhibited good adhesion, flexibility, and spray characteristics.

EXAMPLE VI

The composition of Example V is applied to an outer surface of a cardboard container. The composition exhibits good cushioning and adhesion characteristics.

EXAMPLE VII

In the composition of Example IV, the following microcrystalline waxes are substituted for VICTORY: ULTRAFEX, commercially available from Petrolite Corporation, having a melting point of 148° F. by the ASTM D-127 test method, and a needle penetration value of 28 decimillimeters at 77° F. by the ASTM D-1321 test method; or STARWAX 100, commercially available from Petrolite Corporation, having a melting point of 187° F. by the ASTM D-127 test method, and a penetration value at 77° F. of 16 by the ASTM D-1321 test method; or MW-2305, commercially available from Mobil Oil Corporation, having a melting point of 83° C. by the ASTM D-127 test method, and a penetration value of 27 at 77° C. by the ASTM D-1321 test method.

EXAMPLE VIII

In the composition of Example II, the following resin is substituted for WINGTACK 95: WINGTACK PLUS, commercially available from Goodyear Chemicals, having a melting point of 96° C. by the ASTM E 28 test method.

EXAMPLE IX

In the composition of Example IV, the following resin is substituted for WINGTACK EXTRA: ESCOREZ 2101, commercially available from Exxon Chemical Co., having a melting point of 93° C. by the ASTM E 28 test method.

What is claimed is:

1. A process for cushioning and reinforcing a defined exterior surface of a rupture-prone region of an outer packaging container, the outer packaging container being in overlying relationship to an edible food product, the process comprising the steps of:
   inserting the edible food product into the outer packaging container;
   then selectively applying a liquified polymeric composition to the exterior surface of the defined rupture-prone region at a point-of-contact temperature between about 75° F. and about 160° F. by spraying the liquified polymeric composition, the liquified polymeric composition consisting essentially of:
   a) a polymer exhibiting adhesive properties upon application to the rupture-prone region, the polymer selected from the group consisting of amorphous polyolefins, amorphous polyalphaolefins, copolymers of ethylene vinyl acetate, block copolymers, and mixtures thereof;
   b) a hydrocarbon selected from the group consisting of synthetic tackifying resins, naturally occurring tackifying resins, and mixtures thereof, the hydrocarbon present in an amount sufficient to impart flexible resiliency and adherability to the polymeric material; and
   c) a hydrocarbon wax selected from the group consisting of petroleum waxes, synthetic waxes and mixtures thereof, the wax present in an amount sufficient to impart sprayability to the polymeric material during application to the rupture-prone surface; and
   allowing the applied material to solidify in the form of a flexible resilient coating overlaying the exterior surface of the defined rupture prone region of the outer packaging container and adhering to the exterior surface in an essentially permanent manner sufficient to resist shearing forces which would result in removal of the flexible resilient coating therefrom.

2. The process as defined in claim 1, wherein the outer packaging container comprises a bag formed from a polymeric material; the process further comprising the step of shrink wrapping the bag to conform to the contours of the product, the shrink wrapping step occurring after the polymeric material is applied to the exterior surface of the rupture-prone region of the outer packaging container.

3. The process as defined in claim 1 wherein the polymer is present in an amount between about 10% and about 85% by total weight of the polymeric composition.

4. The process as defined in claim 1 wherein the hydrocarbon tackifying resin has a softening point between about 50° F. and about 275° F., a melting point between about 150° F. and about 155° F., and is selected from the group consisting of natural rosins, modified rosins, glycerol esters of natural rosins, glycerol esters of modified rosins, pentaerythritol esters of natural rosins, pentaerythritol esters of modified rosins, and mixtures thereof.

5. The process as defined in claim 4 wherein the tackifying resin is present in an amount between about 15% and about 85% by total weight of the polymeric material.

6. The process as defined in claim 1 wherein the hydrocarbon wax is present in an amount sufficient to provide the applied polymeric material with a set point between about 75° and about 180° F., the hydrocarbon wax having a melting point between about 135° F. and about 205° F., a needle penetration value between about 10 and about 30 decimillimeters at 77° F., and being selected from the group consisting of petroleum waxes, synthetic waxes, and mixtures thereof.

7. The process as defined in claim 6 wherein the hydrocarbon wax is selected from the group consisting of synthetic paraffin waxes produced by catalytic hydrogenation of carbon monoxide having an essentially microcrystalline structure and a melting point of at least 212° F., paraffin waxes having molecular weights between about 300 and about 450, microcrystalline waxes having molecular weights between about 500 and about 800, and mixtures thereof.

8. The process as defined in claim 7 wherein the hydrocarbon wax is a microcrystalline wax having a melting point between about 135° F. and about 200° F.

9. The process as defined in claim 8 wherein the microcrystalline wax has a thin crystal lattice structure and contains concentrations of n-paraffinic hydrocarbon radicals between about 20% and about 40% and concentrations of branched and napthenic hydrocarbons greater than the concentration of the n-paraffinic hydrocarbons.

10. The process of claim 9 wherein the microcrystalline wax is present in an amount between about 5% and about 30% by weight.

11. The process as defined in claim 1 further comprising the steps:
   admixing the liquified polymeric composition with a non-oxidative gas capable of producing foaming in the polymeric composition to entrain the gas therein, the non-oxidative gas being present in a ratio of between about 1:1 and about 1:10 gas to composition respectively, the admixing step occurring prior to the application step.

12. The process as defined in claim 11 wherein the gas is selected from the group consisting of nitrogen, helium, hydrogen argon, carbon dioxide, and mixtures thereof.

13. The process as defined in claim 1 wherein:
   the polymer is present in an amount between about 10% and about 85% by total weight of the polymeric composition;
   the hydrocarbon tackifying resin has a softening point between about 50° F. and about 275° F., a melting point between about 150° F. and about 155° F., and is selected from the group consisting of natural rosins, modified rosins, glycerol esters of natural rosins, glycerol esters of modified rosins, pentaerythritol esters of natural rosins, pentaerythritol esters of modified rosins, and mixtures thereof, the tackifying resin present in an amount between about 15% and about 85% by total weight of the polymeric material; and
   the hydrocarbon wax is present in an amount between about 5% and about 30% by weight.

* * * * *